United States Patent [19]

Inamori

[11] Patent Number: 4,743,159
[45] Date of Patent: May 10, 1988

[54] DEVICE FOR PIVOTING PIVOTABLE MEMBER BETWEEN CLOSED AND OPEN POSITIONS

[75] Inventor: Tadakazu Inamori, Toyoto, Japan
[73] Assignee: Toyota Jidosha Kabushiki Kaisha, Aichi, Japan
[21] Appl. No.: 845,533
[22] Filed: Mar. 28, 1986
[51] Int. Cl.⁴ .............................................. B66C 1/00
[52] U.S. Cl. .................................. 414/737; 414/752; 901/7; 901/40
[58] Field of Search ............... 414/744 A, 744 B, 752, 414/737; 901/7, 15, 40, 49

[56] References Cited

U.S. PATENT DOCUMENTS

| | | |
|---|---|---|
| 2,518,207 | 8/1950 | Wagner . |
| 4,121,382 | 10/1978 | Dietrich et al. . |
| 4,308,691 | 1/1982 | Horn . |
| 4,342,535 | 8/1982 | Bartlett et al. . |
| 4,423,999 | 1/1984 | Choly . |
| 4,489,640 | 12/1984 | Olson . |
| 4,498,414 | 2/1985 | Kiba et al. . |
| 4,552,506 | 11/1985 | Cummins et al. ............ 901/15 X |
| 4,629,385 | 12/1986 | Irie ............................. 414/744 A X |

FOREIGN PATENT DOCUMENTS

1147525 11/1957 France ............................. 414/737
6154379 3/1986 Japan .

Primary Examiner—Robert J. Spar
Assistant Examiner—Donald W. Underwood
Attorney, Agent, or Firm—Parkhurst & Oliff

[57] ABSTRACT

A device for pivoting a pivotable member about its pivot axis between its closed and open positions includes a pivot arm pivotally supported about an axis parallel and adjacent to the pivot axis of the pivotable member. A free end of the pivot arm has a mechanism attached thereto, which mechanism supports a member which is movable in a direction normal to a circular arc path taken by the free end of the pivot arm. A connector is attached to the movable member and is further connectable to the pivotable member. Upon movement of the pivot arm into correspondence with the pivotable member under action of a pivot arm actuator, the connector is connected to the pivotable member with the movable member positioned at a predetermined position by a positioning device. Once the pivot arm and pivotable member are connected by means of the connector, the positioning device permits the movable member to move in a direction normal to a circular arc path taken by the free end of the pivot arm, thereby allowing the pivot arm and pivotable member to be pivoted together despite misalignment of their pivot axes.

14 Claims, 4 Drawing Sheets

DEVICE FOR PIVOTING PIVOTABLE MEMBER BETWEEN CLOSED AND OPEN POSITIONS

BACKGROUND OF THE INVENTION

The present invention relates to a device for pivoting a pivotable member about an axis between its closed and open positions.

The present applicant and three other inventors collaborated to develop a device for pivoting a pivotable member, as disclosed in Japanese Patent Application No. 59-175623 filed Aug. 23, 1984, which was assigned to the assignee of the present application. This device uses a pivot arm which is pivotally supported about a pivot axis of the pivotable member. The pivot arm has a connector fixed thereto, which is connectable to the pivotable member, so that the pivotable member connected to the pivot arm through the connector is pivoted about its pivot axis between its closed and open positions, when the pivot arm is pivoted between corresponding positions. The pivoting device is simple in construction, economical to manufacture, and highly accurate in positioning of the pivotable member at its open position.

In a pivoting device of the type indicated above, the axis of pivot of the pivot arm should be aligned with the axis of pivot of the pivotable member. In other words, the pivoting device is not applicable to a pivotable member whose axis of pivot is not placed in alignment with the axis of pivot of the pivot arm of the device. Consequently, the device cannot be used for different types of pivotable members whose pivot axis positions are changed from one to another. Even if the device is used for pivotable members of the same type, it is difficult to establish a precise alignment of the pivot axis of the pivotable member with the pivot axis of the pivot arm. Misalignment between the pivot axes of the pivotable member and the pivot arm of the pivoting device will prevent smooth movements of the pivotable member between its closed and open positions. In some cases, jigs and other devices installed around the pivoting device make it impossible to locate the pivotable member such that its pivot axis is aligned with the pivot axis of the pivoting device. In such cases, the pivoting device cannot be used.

SUMMARY OF THE INVENTION

It is accordingly an object of the present invention to provide a device for pivoting a pivotable member between its closed and open positions, which assures smooth movements of the pivotable member between the closed and open positions even if the axis of pivot of the pivotable member is offset from the axis of pivot of a pivot arm of the device.

According to the present invention, there is provided a device for pivoting a pivotable member about a first axis between its closed and open positions, comprising: (a) a pivot arm pivotally supported about a second axis which is parallel and adjacent to the first axis; (b) an arm actuator for pivoting the pivot arm; (c) a movable member; (d) a first mechanism supported at a free end of the pivot arm, to movably support the movable member in a direction normal to a circular arc path taken by the free end of the pivot arm; (e) a connector attached to the movable member and connectable to the pivotable member; and (f) positioning means for positioning the movable member at a predetermined position in the normal direction upon connection of the connector to the pivotable member, the positioning means permitting the movable member to be moved in the normal direction after connection of the connector to the pivotable member.

In the device of the present invention constructed as described above, the movable member is supported by the first mechanism at the free end of the pivot arm, so that the movable member is movable in a direction normal to the circular arc path described by the free end of the pivot arm. According to this arrangement, the movable member and the connector attached thereto are moved in the above-indicated normal direction so as to absorb or accommodate a difference between a path taken by the free end of the pivotable member and the path of the free end of the pivot arm, even if the difference exists due to misalignment of the pivot axis of the pivotable member with that of the pivot arm of the device. Hence, the connector movable in the normal direction relative to the pivot arm can take the same circular path as the part of the pivotable member to which the connector is connected. Thus, the instant device is capable of effecting smooth movements of the pivotable member between the closed and open positions, without having to align the pivot axes of the pivotable member and the pivot arm of the device, as required in the device disclosed in the previously identified Japanese Patent Application No. 59-175623. More specifically, the instant device may be used for different kinds of pivotable members whose pivot axes are located at different positions. Further, the instant device may be used even in the case where jigs or other devices installed around the instant device prevent alignment of the pivot axes of the pivotable member and the pivot arm. Since the movements of the instant device according to the invention are a mere combination of a pivotal motion of the pivot arm and a linear motion of the movable member in the normal direction, the instant device provides higher accuracies of positioning and pivotal path of the pivotable member than does an industrial robot. Further, the instant device is simpler in construction and available at a lower cost than an industrial robot.

According to one embodiment of the invention, the first mechanism comprises a guide which is supported by the pivot arm and which extends in the normal direction, and a slide which is slidably supported by the guide in the normal direction and which supports said movable member.

In one advantageous arrangement of the above embodiment, the guide comprises a guide rod, and the positioning means comprises a spring disposed on the guide rod on each side of the slide to hold the slide at a predetermined position.

In another advantageous arrangement of the same embodiment, the movable member is a support shaft which is slidably supported by the slide in a direction tangential to the circular arc path of the free end of the pivot arm. The support shaft holds the connector at its front end, and is biased in a direction from the front end toward a rear end opposite to the front end, by a first spring disposed between the support shaft and the slide.

In one form of the above arrangement, the support shaft has a rear end portion which terminates in the rear end. The rear end portion has a smaller diameter than the remainder of the support shaft, thereby providing a shoulder face at an end of the rear end portion remote from the rear end. The first spring is disposed between a first spring seat which slidably fits on the rear end portion so as to be abuttable on a surface of the slide, and a second spring seat which is fixed to the rear end, whereby the first spring seat is forced against the shoulder face. The support shaft is also biased in a direction from its rear end toward its front end by a second spring disposed between the front end of the support shaft and the slide. A biasing force of the second spring is selected to be smaller than that of the first spring, whereby the first spring seat is held seated on the shoulder face and on the surface of the slide.

According to another embodiment of the invention, the positioning means comprises a pair of air cylinders which are spaced apart from each other in the normal direction such that the movable member is disposed between the pair of air cylinders. The pair of air cylinders have a pair of piston rods which are movable toward each other to their respective advanced position, and away from each other to their respective retracted positions. The piston rods substantially block movement of the movable member in the normal direction when the piston rods are located at their advanced positions, but permit movement of the movable member in the normal direction when the piston rods are located at their retracted positions.

According to a further embodiment of the invention, the pivoting device further comprises: a second mechanism for supporting the movable member so as to permit the movable member to be moved in a direction tangential to the circular arc path of the free end of the pivot arm; biasing means for biasing the movable member in the tangential direction toward the free end of the pivot arm and away from the pivotable member; and positioning stopper means for providing abutting contact with the pivotable member, to position the pivotable member at its open position against a biasing action of the biasing means.

In the above embodiment, the movable member is movable not only in a direction normal to the circular arc path of the pivot arm, but also in the tangential direction. With the movable member moved in the tangential direction relative to the free end of the pivot arm, it is possible to bring the pivotable member into abutting contact with the positioning stopper means after the pivotable member is opened by a pivotal movement of the pivot arm. The abutting contact of the pivotable member against the positioning stopper means permits precise positioning of the pivotable member at its open position, irrespective of the inaccuracy of positioning of the connector with respect to the pivotal member, that is, irrespective of a variation in position of the connector relative to the pivotable member, or dimensional errors of the pivotable member.

According to one advantageous arrangement of the above embodiment, the second mechanism comprises: a hollow member supported by the pivot arm so as to extend in the tangential direction; and a slide pin slidably fitted in the hollow member and having a front end which projects out of a corresponding end of the hollow member. The first mechanism is attached to the front end of the slide pin. In one form of the above arrangement, the slide pin has a rear end opposite to the front end, and the biasing means comprises a compression coil spring which bears at opposite ends thereof on the hollow member and the rear end of the slide pin.

According to another advantageous arrangement of the above embodiment, the pivoting device further comprises: a movable base which is movably supported by the free end of the pivot arm in the tangential direction, and which supports the first and second mechanisms; and a base actuator which is provided between the free end of the pivot arm and the movable base, to move the movable base toward and away from the free end of the pivot arm in the tangential direction. The positioning stopper means comprises a stopper fixed to the free end of the pivot arm, and the pivotable member abuts on the stopper when the movable base is moved by the base actuator toward the free end of the pivot arm. In one form of the above arrangement, the pivot arm has a bushing attached to its free end so as to extend in the tangential direction, and the second mechanism comprises: a hollow member slidably fitted in the bushing and fixed at one end thereof to the movable base, the hollow member cooperating with the bushing to guide the movable base in the tangential direction; and a slide pin slidably fitted in the hollow member and having a front end which projects out of a corresponding end of the hollow member. The first mechanism is attached to the front end of the slide pin.

According to an alternative advantageous arrangement of the same embodiment, the positioning stopper means is a stationary member which maintains its position irrespective of pivotal movements of the pivot arm.

According to a still further embodiment of the invention, the connector comprises a vacuum cup which is connected to the pivotable member, with a sucking pressure acting on a surface of the pivotable member.

According to one advantageous arrangement of the above embodiment, the vacuum cup is attached to one end of a support shaft which functions as said movable member. In this instance, the support shaft is movable in the tangential direction within a predetermined range, and is biased by a spring in a direction from an other end thereof toward the above-indicated one end thereof.

BRIEF DESCRIPTION OF THE DRAWINGS

The foregoing and other objects, features and advantages of the present invention will be better understood by reading the following detailed description of the preferred embodiments of the invention, when considered in conenction with the accompanying drawings, in which.

DETAILED DESCRIPTION OF THE PREFERRED EMBODIMENTS

To further clarify the concept of the present invention, the preferred embodiments of the invention will be described in detail referring to several figures of the accompanying drawings.

Figure 1:
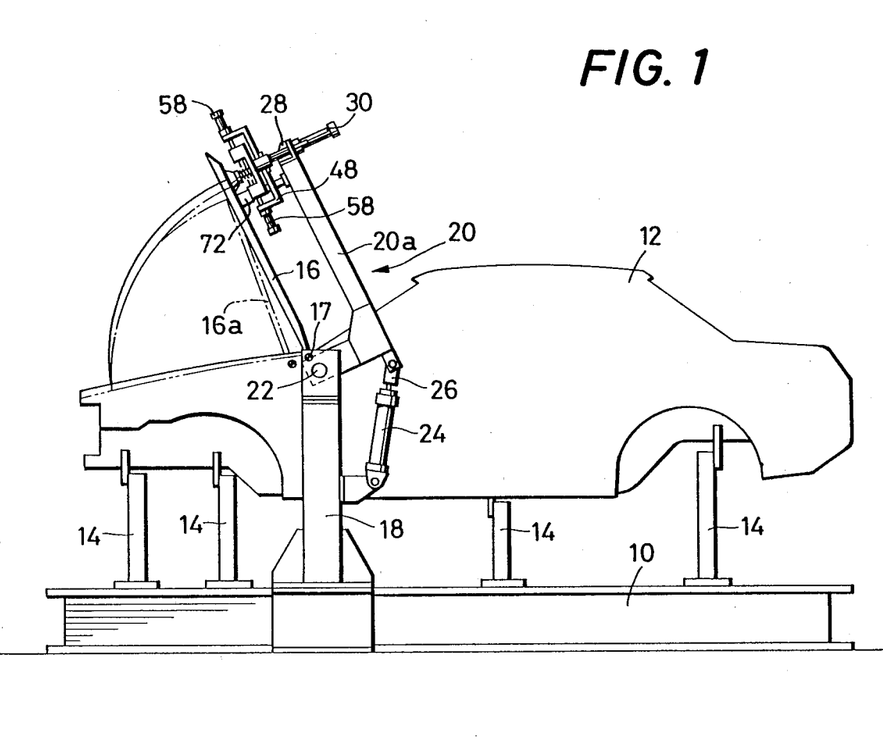
FIG. 1 is a front elevational view of a production line for automobiles, equipped with one embodiment of a pivoting device of the present invention.

Referring first to FIG. 1, reference numeral 10 designates a base structure for positioning a body 12 of a motor vehicle which is conveyed along a production line by a shuttle conveyor or other suitable transferring means. The vehicle body 12 transferred onto the base structure 10 is mounted on a plurality of pillars 14 which are erected on the base structure 10. The body 12 has an engine hood 16 for covering an engine compartment in a front section of the body. The hood 16 is a pivotable member which is pivotally supported at its rear end about an axis 17 which extends transversely to the body 12 (in a direction perpendicular to the production line). The body 12 is supported by the pillars 14 such that the pivot axis 17 extends horizontally. The production line is adapted to accommodate bodies of motor vehicles of different models, whose engine hoods are located at different heights as measured from the base structure 10, as indicated at 16a in phantom lines by way of example.

Secured to the base structure 10 is a device for pivoting the hood 16 about the axis 17 between its closed position at which the hood 16 covers the engine compartment, and its open position of FIG. 1. This device (hereinafter referred to as "pivoting device") comprises a pivot arm 20 pivotally supported on a column 18 fixed on the base structure 10. Described more specifically, the column 18 is positioned on the base structure 10 so as to extend upright on one side of the vehicle body 12 positioned on the pillars 14, such that the upper end of the column 18 is located near the pivot axis 17 of the hood 16. The column 18 has a pivot shaft 22 fixed to the upper end so as to extend horizontally, parallel to the pivot axis 17 of the hood 16. The pivot arm 20 of the pivoting device is pivotally supported about the pivot axis 22 at the upper end of the column 18. An arm actuator in the form of an air cylinder 24 is fixed at its one end to the column 18, and connected at its other end to the pivot arm 20. That is, a piston rod 26 extending from the other end of the air cylinder 24 is connected at its free end to a portion of the pivot arm 20 which is spaced a suitable distance from the pivot shaft 22 on the upper end of the column 18. With the piston rod 20 moved by the air cylinder 24 between its advanced and retracted positions, the pivot arm 20 is pivoted about the pivot shaft 22 between its lower and upper positions corresponding to the closed and open positions of the engine hood 16.

Figure 2:
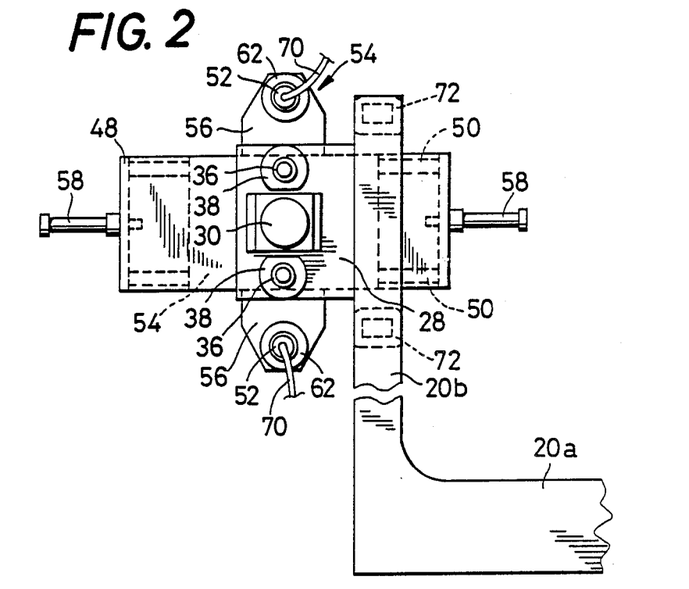
FIG. 2 is a fragmentary plan view showing a part of the pivoting device of FIG. 1 near the free end of a pivot arm of the device.
Figure 3:
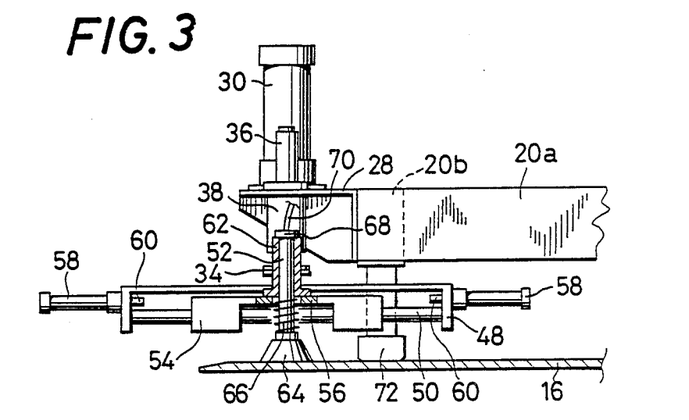
FIG. 3 is a fragmentary front elevational view partly in cross section of the part of the pivoting device shown in FIG. 2.
Figure 4:
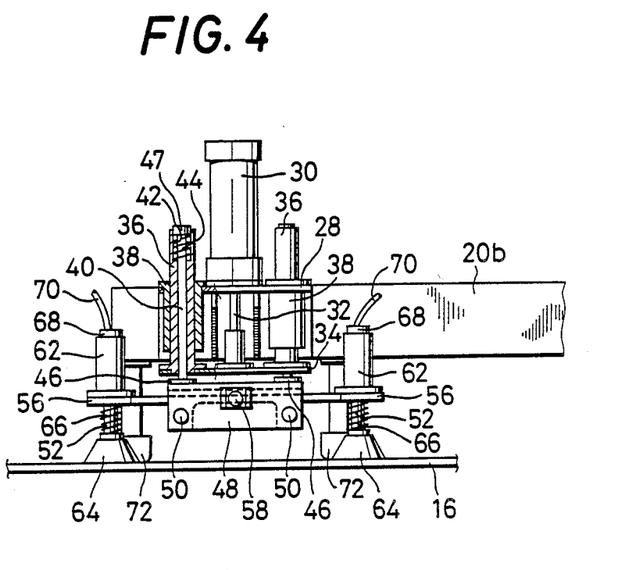
FIG. 4 is a fragmentary side elevational view partly in cross section of the part of the pivoting device shown in FIG. 2.

Referring further to FIGS. 2 through 4, the pivot arm 20 includes a pivotal portion 20a extending a suitable distance in a plane perpendicular to the pivot axis 17 of the hood 16, and a transverse portion 20b which extends from the free end of the pivotal portion 20a transversely to the body 12 (perpendicularly to the column 18) so that the free end of the transverse portion 20b is located in the middle of the width of the hood 16 (as viewed along the pivot axis 17). The transverse portion 20b carries a bracket 28 fixed to the free end. To the bracket 28, there is secured an air cylinder 30 which has a piston rod 32 extending in a direction from the transverse portion 20b of the pivot arm 20 toward the hood 16, as shown in FIG. 4. In this arrangement, actuating the air cylinder 30 will cause the piston rod 32 to be advanced and retracted in a direction tangential to a circular arc path (hereinafter referred to as "tangential direction") taken by the free end of the pivotal portion 20a of the pivot arm 20 (i.e., taken by the transverse portion 20b). To the free end of the piston rod 32 is secured a movable base plate 34 which extends along the transverse portion 20b of the pivot arm 20 (along the width of the body 12 or hood 16). A pair of hollow shafts 36 are fixed at their front ends to opposite longitudinal ends of the base plate 34, respectively, such that the hollow shafts 36 extend parallel to the piston rod 32 of the air cylinder 30 which is disposed between the hollow shafts 36. The hollow shafts 36 slidably fit in respective guide bushings 38 which are fixed in the bracket 28. The hollow shafts 36 cooperate with the guide bushings 38 to guide the movable base plate 34 in the tangential direction when the base plate 34 is moved upon activation of the air cylinder 30. The hollow shafts 36 receive respective slide pins 40 such that the slide pins 40 are axially slidable in the hollow shafts 36. Each of the slide pins 40 has a large-diameter front end 46 located out of the front end of the hollow shaft 36, and a rear end 47 which is movable within a counterbore 42 formed in the rear portion of the hollow shaft 36 remote from the front end fixed to the base plate 34. The slide pin 40 is biased in a direction from the front end 46 toward the rear end 47, by a compression coil spring 44 which is disposed between the rear end 47 and the bottom of the counterbore 42, whereby the large-diameter front end 46 of the slide pin 40 is normally held in abutting contact with the bottom surface of the movable base plate 34.

The slide pins 40 are fixed at their front ends 46 to a support member 48 which is a frame having a generally U-shaped cross section as illustrated in FIG. 3. This support member 48 supports at its opposite side walls a pair of parallel guide rods 50 which extend in a direction normal to the circular arc path (hereinafter referred to as "normal direction") taken by the free end of the pivotal portion 20a of the pivot arm 20, that is, in a direction parallel to the pivotal portion 20a. These guide rods 50 slidably support a slide 54 on wihch are supported a pair of movable members in the form of a pair of support shafts 52. Described in more detail referring to FIG. 2, the slide 54 is provided, at its longitudinally middle portion, with a pair of ears 56 which extend outwardly in opposite directions at right angles to the lines of movement of the slide 54. The support shafts 52 are slidably supported by the respective ears 56 of the slide 54. The support shafts 52 movable with the slide 54 are therefore movable along the guide rods 50 in a direction normal to the circular arc path of the pivot arm 20. In the present embodiment, therefore, the guide rods 50 and the slide 54 constitute major elements of a first mechanism which permits the support shafts 52 to be moved in the normal direction (parallel to the pivotal portion 20a of the pivot arm 20).

To the opposite side walls of the support member 48, there are attached a pair of air cylinders 58, respectively, such that their piston rods 60 are movable parallel to the guide rods 50 (in the normal direction), toward each other to their respective advanced positions, and away from each other to their respective retracted positions. In the advanced positions, the piston rods 60 abut on the slide 54, thereby blocking movements of the slide 54 and the support shafts 52 in the normal direction parallel to the guide rods 50. In the retracted positions, however, the piston rods 60 permit the slide 54 and the support shafts 52 to move in the normal direction. In the present embodiment, therefore, the pair of air cylinders 58 function as positioning means for positioning the support shafts 52 at predetermined positions in the normal direction.

As indicated in FIGS. 3 and 4, the support shafts 52 are axially slidably supported by guide bushings 62 which are fixed to the respective ears 56 of the support member 48, such that the support shafts 52 are movable in the tangential direction toward and away from the hood 16. Each of the support shafts 52 has a vacuum cup 64 fixed to its front end on the side of the hood 16. The vacuum cup 64 is formed of an elastic rubber material and serves as a connector which is detachably connectable to the hood 16. A compression coil spring 66 is disposed between the vacuum cup 64 and the end of the guide bushing 62 from which the front end portion of the support shaft 52 projects. Thus, the support shaft 52 is biased by the spring 66 in a direction from its rear end remote from the vacuum cup 64, toward its front end. The support shaft 52 is formed with a stopper 68 attached to the rear end. The stopper 68 has a larger diameter than the shafts 52, so that the movement of the shaft 52 under a biasing action of the coil spring 66 is limited by the stopper 68 abutting on the corresponding end face of the guide bushing 62. Namely, each support shaft 52 is biased toward its advanced position with respect to the guide bushing 62 on the slide 54. The slide 54 and the support shafts 52 are normally held at their retracted position by biasing forces of the compression coil springs 44 which act on the slide 54 via the slide pins 40 and the support member 48. This retracted position of the slide 54 and support shafts 52 is determined by means of abutting contact of the large-diameter front ends 46 of the slide pins 40 with the base plate 34. Thus, in the present embodiment, the coil springs 44 serve as biasing means for biasing the slide 54 and support shafts 52 in the tangential direction toward their retracted position. When the piston rod 32 of the air cylinder 30 is moved to its advanced position while the slide 54 and support shafts 52 are placed in their retracted position with the stoppers 68 abutting on the guide bushings 62, the slide 54 and support shafts 52 are moved in the tangential direction with respect to the circular arc path of the pivot arm 20, toward their advanced position (toward the hood 16), through the base plate 34 and support member 48. When the piston rod 32 is moved to its retracted position, the slide pins 40 are permitted to be moved by the biasing forces of the coil springs 44 in the same direction as the piston rod 32, whereby the slide 54 and support shafts 52 are moved to their retracted position in the tangential direction away from the hood 16. In this embodiment, therefore, the hollow shafts 36 and the slide pins 40 constitute major components of a second mechanism which permits the slide 54 and support shafts 52 to be moved in the tangential dirrection parallel to a line tangential to the circular arc path taken by the free end of the pivotal portion 20a of the pivot arm 20.

Reference numeral 70 indicates air hoses which connect air passages formed through the support shafts 52 and the vacuum cups 64, to a vacuum source (not shown).

To the transverse portion 20b of the pivot arm 20, there are fixed two positioning stoppers 72 which are disposed on opposite sides of the support member 48, as shown in FIGS. 2 and 4. These positioning stoppers 72 serve to position the hood 16 exactly at its open position, as described later in detail.

The amounts of pivotal movement of the pivot arm 20, or the lower and upper positions of the pivot arm 20 corresponding to the closed and open positions of the hood 16 are determined as follows:

The upper position of the pivot arm 20 corresponding to the open position of the hood 16 is determined such that the position of the free end of the positioning stoppers 72 in the tangential direction does not permit an excessive angle of opening of the good 16 of a vehicle body 12 whose points of contact with the vacuum cups 64 are nearest to the base structure 10, of all the vehicle bodies 12 to be handled in the production line equipped with the present pivoting device. On the other hand, the lower position of the pivot arm 20 corresponding to the closed position of the hood 16 is determined such that the vacuum cups 64 on the support shafts 52 in the retracted position are spaced a slight distance from the surface of the hood 16 of a vehicle body 12 whose height (from the base structure 10) of the hood in the closed position is the largest of all the vehicle bodies to be handled in the present production line.

The amount of movement of the piston rod 32 of the air cylinder to its advanced and retracted positions is determined as follows:

The amount of movement of the piston rod 32 to its advanced position is determined so as to be sufficient for air-tight contact of the vacuum cups 64 with the surface of the hood 16 of a vehicle body 12 whose height of the hood in the closed position is the smallest of all the vehicle bodies. On the other hand, the amount of movement of the piston rod 32 from its advanced position to its retracted position is determined so as to be sufficient for abutting contact of the positioning stoppers 72 in the upper position of the pivot arm 20, with the hood 16 which is located farthest from the end of the positioning stoppers 72 of all the hoods of the vehicle bodies 12..

In the automobile production line equipped with the pivoting device which is constructed as described above, the vehicle body 12 is transferred with its hood 116 held in its closed position, and mounted on the pillars 14. When the body 12 is conveyed toward position above the pillars 14, the pivot arm 20 is placed in its open position of FIG. 1, so as to facilitate the transfer of the body 12 onto the pillars 14. The body 12 is positioned so that the pivot axis 17 of the hood 16 is located adjacent to the pivot shaft 22 of the pivot arm 20. In this condition, the support shafts 52 are held in their retracted position under the biasing actions of the coil springs 44, with the large-diameter front ends 46 of the slide pins 40 abutting on the base plate 34. Further, the piston rods 60 of the air cylinders 58 are placed in their advanced positions, thereby holding the slide 54 at a predetermined position halfway through the length of the guide rods 50. In the meantime, the support shafts 52 and the vacuum cups 64 are held in their advanced positions relative to the slide 54, unde the biasing actions of the coil springs 66, with the stoppers 68 abutting on the rear ends of the respective guide bushings 62.

To open the hood 16, the air cylinder 24 is first actuated to advance the piston rod 26 and thereby pivot the pivot arm 20 in the counterclockwise direction (in FIG. 1) from its upper position to its lower position. The pivot arm 20 is stopped at its lower position at which the vacuum cups 64 are slightly spaced from the surface of the hood 16 in the closed position. Subsequently, the air cylinder 30 is actuated to advance the piston rod 32 to its advanced position and thereby advance the support shafts 52 and the vacuum cups 64. As a result, the vacuum cups 64 come into air-tight contact with the surface of the hood 16. As previously described, the advanced position of the piston rod 32 is determined so as to permit an air-tight contact of the vacuum cups 64 with the surface of the hood 16 even if the body 12 has the hood 16 at the highest position of all the bodies 12 to be handled on the production line. This indicates a further movement of the piston rod 32 even after the vacuum cups 64 have come into contact with the hood 16. Unnecessary movements of the vacuum cups 64 due to the further movement of the piston rod 32 are accommodated by movements of the support shafts 52 against the biasing forces of the coil springs 66.

Upon completion of the air-tight contact of the vacuum cups 64 with the hood 16, a switch valve of the vacuum source (not shown) is operated to apply a vacuum pressure to the vacuum cups 64 so that sucking pressure acts on the surface of the hood 16. Meanwhile, the air cylinders 58 are actuated to retract the piston rods 60 away from the slide 54, to allow the slide 54 and the support shafts 52 to be moved along the guide rods 50, that is, in the normal direction with respect to the circular arc path of the pivot arm 20 (in the direction parallel to the pivotal portion 20a of the pivot arm 20). Successively, the air cylinder 24 is actuated in the reverse direction to retract the piston rod 26 and thereby cause the pivot arm 20 to be pivoted in the clockwise direction (in FIG. 1) from the lower position to the upper position of FIG. 1. Upon commencement of a pivotal movement of the pivot arm 20 from its lower position, the stoppers 68 of the support shafts 52 come into abutting contact with the end faces of the corresponding guide bushings 62. Then, the hood 16 connected to the pivot arm 20 by the vacuum cups 64 starts to be pivoted by the pivot arm 20. Since the pivot axis 17 of the hood 16 is offset from the pivot axis 22 of the pivot arm 20, the free end of the hood 16 takes a circular arc path (indicated in solid line in FIG. 1) which is different from the circular arc path taken by the free end of the pivot arm 20 (indicated in one-dot chain line in FIG. 1). However, the vacuum cups 64 take a circular arc path identical with the path of the free end of the hood 16, because the support shafts 52 supporting the vacuum cups 64 are movable relative to the pivot arm 20 in the normal direction with respect to the circular arc path of the pivot arm 20. Therefore, the hood 16 can be smoothly opened with minimum elastic deformation of the vacuum cups 64 sucking on the same area of the surface of the hood. When the pivot arm 20 has been pivotally moved to its upper position, the piston rod 32 is retracted whereby the slide 54, support shafts 52 and vacuum cups 64 which are connected to the piston rod 32 via the coil springs 44 are moved in the tangential direction, so as to effect a further pivotal movement of the hood 16 toward its open position until the hood 16 comes into abutting contact with the free ends of the positioning stoppers 72 fixed to the transverse portion 20b of the pivot arm 20. Thus, the hood 16 is positioned exactly at its open position. As previously indicated, the amount of movement of the piston rod 32 to its retracted position is determined so as to be sufficient for abutting contact of the hood 16 with the positioning stoppers 72 (with the arm 20 located at its upper position), even if the hood 16 is located farthest from the positioning stoppers 72 of all the hoods 16 of the bodies 12 to be handled on the instant production line. Consequently, the piston rod 32 is retracted a further distance even after the hood 16 has come into contact with the positioning stoppers 72. However, this movement of the piston rod 32 is absorbed or accommodated by movements of the base plate 34 and the hollow shafts 36 in the tangential direction with respect to the circular arc path of the pivot arm 20, away from the hood 16 against the biasing actions of the coil springs 44. Therefore, the hood 16 is forced against the positioning stoppers 72 with the biasing forces of the coil springs 44, and is thus located exactly at the predetermined open position.

When the hood 16 is moved from the open position to the closed position, the piston rod 26 is first advanced to pivot the hood 16 away from the positioning stoppers 72 in the counterclockwise direction (in FIG. 1). After the hood 16 has been pivotally moved to its closed position, the switch valve of the vacuum source is operated to apply pressurized air to the vacuum cups 64 and thereby disconnect the vacuum cups 64 from the hood 16.

The hood 16a of the body 12 of another type indicated in two-dot chain line in FIG. 1 may be opened and closed in the same manner as described above.

The pivoting device which has been described above is capable of effecting smooth opening and closing of hoods of various kinds of vehicle bodies, whose pivot axes are offset from the pivot axis 22 of the pivot arm 20 by different distances in different directions. The opening and closing of the hoods 16 are achieved through a combination of simple motions of the pivoting device, that is, pivotal movements of the pivot arm 20 and linear movements of the slide 54 (and support shafts 52) in the normal direction with respect to the circular arc path of the pivot arm 20 (in the direction parallel to the pivotal portion 20a of the pivot arm 20). Hence, the instant pivoting device serves its function with a relatively simple structural arrangement, and is accordingly economical to manufacture.

In addition, the movement of the support shafts 52 relative to the pivot arm 20 in the tangential direction accommodates fluctuations in the amount of elastic deformation of the vacuum cups 64, and positional fluctuations of the hoods 16 of different kinds of vehicle bodies 12. This movement of the support shafts 52, when combined with the positioning stoppers 72, is particularly effective to attain precise positioning of the hood 16 at its open position, especially where elastic suckers (rubber cups) are used, as in the present embodiment, as the connector for connecting the hood 16 to the pivot arm 20. The elastic suckers tend to be easily deformed, and the hood 16 is subject to a variation in its open position, due to the elastic deformation of the suckers. In the present pivoting device, however, the positioning stoppers 72 and the movement of the support shafts 52 in the tangential direction effectively compensate for such a positional variation of the hood 16.

The present pivoting device is suitably employed at a station where a sealing material is applied to the hood 16 while it is held in its open position. Namely, the precise positioning of the hood 16 at the predetermined open position makes it possible to apply a sealing material exactly to a desired area on the hood 16, even when the sealing bead is relatively narrow.

While the compression coil springs 66 are provided in the illustrated embodiment to accommodate a variation in height of the hoods 16 of different vehicle bodies 12, it is possible to eliminate these springs 66 if the amount of pivotal movement of the pivot arm 20 to the lower position is adjustable depending upon the various heights of the hoods 16 of the different bodies 12 so that the vacuum cups 64 properly contact the surface of the hoods 16 when the pivot arm 20 has been pivoted to the lower position.

In the illustrated embodiment, the positioning stoppers 72 and the second mechanism (36, 38, etc.) permitting the tangential movement of the support shafts 52 are provided to assure precise positioning of the hood 16 at the predetermined open position even if there is an error in the position of the vacuum cups 64 relative to the hood 16 in the tangential direction, as previously described. However, the hood 16 may be located at the open position with a generally satisfactory level of accuracy, even when the above-indicated second mechanism and the positioning stoppers 72 are not provided. In other words, the present invention may be embodied without the second mechanism (36, 38, etc.), compression coil springs 44 and positioning stoppers 72.

Figure 5:
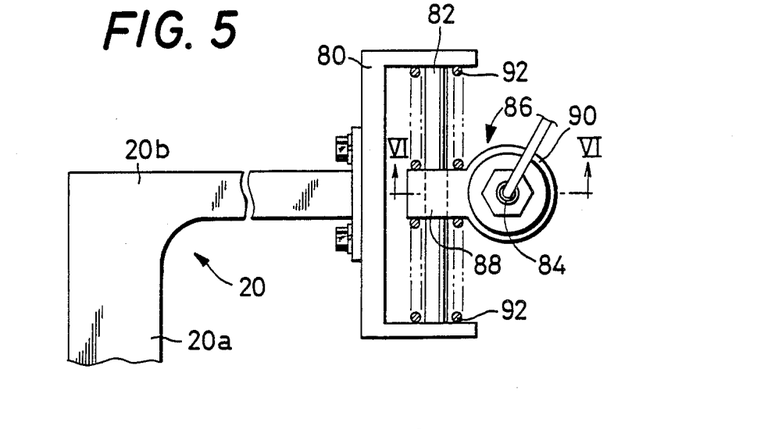
FIG. 5 is a fragmentary plan view of a modified embodiment of the invention, corresponding to FIG. 2.
Figure 6:
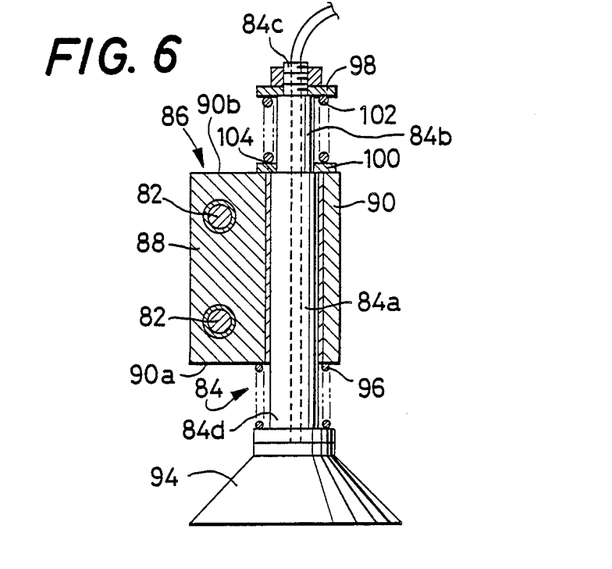
FIG. 6 is an elevational view taken along line VI—VI of FIG. 5.

Referring next to FIGS. 5 and 6, another preferred embodiment of the invention will be described.

In this modified embodiment, a first mechanism for supporting a support shaft 84 in the normal direction, a second mechanism for movably supporting the support shaft 84 in the tangential direction, and other components are supported on a bracket 80 which is fixed at the free end of the transverse portion 20b of the pivot arm 20. Thus, the present embodiment is simpler in construction than the preceding embodiment. The bracket 80 is a frame structure having a generally U-shaped cross section as indicated in FIG. 5. Two parallel guide rods 82 are supported at their opposite ends by the opposite side walls of the bracket 80. The guide rods 82 slidably support a slide 86 which in turn supports a movable member in the form of the support shaft 84 indicated above. The slide 86 consists of an ear 88 and a boss 90 which are integral with each other. The ear 88 slidably engages the guide rods 82, while the boss 90 extends at right angles to the guide rods 82. The support shaft 84 slidably fits in the boss 90. The guide rods 82 extend in the normal direction with respect to a circular arc path taken by the free end of the pivot arm 20, while the boss 90 extends in the tangential direction of the circular arc path of the pivot arm 20. In this arrangement, the support shaft 84 is guided in the normal direction by the guide rods 82 and the ear 88 of the slide 86, and in the tangential direction by the boss 90. In the present embodiment, therefore, the guide rods 82 and the ear 88 cooperate to constitute the first mechanism for permitting the support shaft 84 to be moved in the normal direction, while the boss 90 serves as the second mechanism for permitting the support shaft 84 to be moved in the tangential direction.

Each of the guide rods 82 is provided with a pair of compression coil springs 92, each of which bears at opposite ends thereof on the corresponding side wall of the bracket 80 and the ear 88. Since these coil springs 92 for each guide rod 82 have the same biasing force, the ear 88 of the slide 86 is normally held at its predetermined position halfway through the length of the guide rods 82, as indicated in FIG. 5. Thus, the coil springs 92 serve as positioning means for positioning the slide 86 and the support shaft 84 at their predetermined position. During pivotal movements of the pivot arm 20 for opening and closing the hood 16, however, the coil springs 92 permit the slide 86 to be moved along the guide rods 82, against a biasing action of one of the two springs 92 (for each guide rod 82) on the side of the moving direction of the slide 86.

As illustrated in FIG. 6, the support shaft 84 is a stepped-diameter shaft which has a large-diameter portion 84a with a front end 84d, and a small-diameter rear end portion 84b terminating in a rear end 84c. The small-diameter portion 84b is smaller in diameter than the large-diameter portion 84a, whereby a shoulder face 104 is provided at the joining ends of the large-diameter and small-diameter portions 84a, 84b. The support shaft 84 has a vacuum cup 94 fixed to the front end 84d. A compression coil spring 96 is disposed between the vacuum cup 94 and the opposite surface 90a of the boss 90. Another compression coil spring 102 is disposed between a spring seat 98 which is fixed to the rear end 84c of the support shaft 84, and another spring seat 100 which slidably fits on the rear end portion 84b. Since a biasing force of the spring 102 is larger than that of the spring 96, the support shaft 84 is biased by the spring 102 in a direction from the front end 84d toward the rear end 84c, toward its retracted position at which the spring seat 100 is held seated on the shoulder face 104 of the support shaft 84 and on the corresponding surface 90b of the boss 90. In this embodiment, therefore, the coil spring 102 functions as biasing means for biasing the support shaft 84 toward its retracted position.

For precise positioning of the hood 16 at its open position, suitable stationary positioning stopper means (not shown) is provided for abutting contact with the hood 16. For example, such stationary positioning stopper means is fixed to a free end of an L-shaped support member which extends from the column 18 such that the stopper means is located in the middle of the width of the hood 16. In this instance, the stopper means maintains its fixed position irrespective of pivotal movements of the pivot arm 20, contrary to the positioning stoppers 72 of the preceding embodiment which are movable with the pivot arm 20.

In the present modified embodiment of FIGS. 5 and 6, the amount of movement of the pivot arm 20 to its lower position corresponding to the closed position of the hood 16 is determined so as to be sufficient for air-tight contact of the vacuum cup 94 with the surface of the hood 16 whose height in the closed position is the smallest of all the hoods 16 of different vehicle bodies 12 to be mounted on the pillars 14 on the base structure 10. A variation in the height of the hoods 16 of the different bodies 12 is accommodated by a movement of the support shaft 84 against the biasing force of the compression coil spring 96. With the vaccum cup 94 sucking on the surface of the hood 16, the pivot arm 20 is pivoted from the lower position toward the upper position, and the hood 16 is pivoted with the surface 90b abutting on the spring seat 100. During the pivotal movements of the pivot arm 20 and the hood 16, the slide 86 and the support shaft 84 are permitted to move in the normal direction with respect to the circular arc path of the pivot arm 20, whereby the vacuum cup 94 takes the same path as the free end of the hood 16, as in the preceding embodiment.

Further, the amount of movement of the pivot arm 20 to its upper position corresponding to the open position of the hood 16 is determined so as to be sufficient for abutting contact of the hood 16 with the stationary positioning stopper means, even if there exists an error in the position of the vacuum cup 94 relative to the surface of the hood 16 in the tangential direction with respect to the circular arc path of the pivot arm 20. A pivotal movement of the pivot arm 20 after the hood 16 has come into contact with the postioning stopper means is absorbed by means of compression of the coil spring 102, whereby the hood 16 is positioned by the positioning stopper means exactly at the predetermined open position.

While the present invention has been described in its preferred embodiments with a certain degree of particularity, for illustrative purposes only, it is to be understood that the invention is not confined to the precise disclosure of the illustrated embodiments, but may be otherwise embodied.

Although the first embodiment of FIGS. 1 through 4 is adapted to finally position the hood 16 at its open position after the hood 16 has been pivotally moved to the upper position of the pivot arm 20, it is possible to bring the hood 16 into abutment against the positioning stoppers 72 to position the hood 16 relative to the pivot arm 20 at a suitable point of time while the pivot arm 20 and the hood 16 are pivoted from the lower position toward the upper position of the pivot arm 20.

In the case where the pivot axes of the hoods 16 of all kinds of vehicle bodies 12 are offset from the pivot axis 22 of the pivot arm 20 in the same direction, it is not necessary that the slides 54 and 86 be movable in either one of opposite directions normal to the circular arc path of the pivot arm 20, when the pivot arm 20 is moved to open the hood 16. In this case, the slides 54, 86 are always moved in the same direction relative to the pivot arm 20 during the pivotal movement of the pivot arm to its upper position to open the hood 16. Namely, when the pivot arm 20 is pivoted from its lower position to its upper position, the slides 54, 86 are always moved in the same direction, starting from the fixed one of the opposite ends of their moving range.

Although the illustrated embodiments employ the elastic vacuum cups 64, 94 as connectors for detachably connecting the hood 16 to the pivot arm 20, such vacuum suckers may be replaced by other suitable connecting means such as electromagnets, hooks, or jaws which are operable between closed and open positions.

While the pivoting device is suitably used for opening and closing the engine hood of vehicle bodies at one station in a production line of motor vehicles, the principle of the invention is applicable to other types of pivotable members which are supported pivotally about an axis.

It will be obvious to those skilled in the art that various other changes, modifications and improvements may be made in the invention without departing from the spirit and scope of the invention defined in the appended claims, such as, for example, in connection with the mechanisms which permit the connector to be moved relative to the pivot arm in the normal and tangential directions with respect to the circular arc path taken by the free end of the pivot arm.

What is claimed is:

1. A device for pivoting a pivotable member about a first axis between its closed and open positions, comprising:
    a pivot arm pivotally supported about a second axis, said second axis being parallel to said first axis and substantially aligned with said first axis as viewed in an axial direction of said first and second axes;
    means for pivotally supporting said pivot arm about said second axis, said supporting means being spaced apart from the pivotable member in the axial direction of said first and second axes;
    an arm actuator for pivoting said pivot arm;
    a first mechanism attached to a free end of said pivot arm and supporting at least one member which is movable in a direction normal to a circular arc path taken by said free end of said pivot arm;
    connecting means attached to said movable member for removably connecting said pivot arm to said pivotable member; and
    positioning means for positioning said movable member at a predetermined position in said normal direction upon connection of said pivot arm to said pivotable member, said positioning means permitting said movable member to be moved in said normal direction after connection of said pivot arm to said pivotable member.

2. A device according to claim 1, wherein said first mechanism comprises a guide which is supported by said pivot arm and which extends in said normal direction, and a slide which is slidably supported by said guide in said normal direction and which supports said at least one movable member.

3. A device according to claim 2, wherein said guide comprises at least one guide rod, and said positioning means comprises a spring disposed on said at least one guide rod on each side of said slide to hold said slide at said predetermined position.

4. A device according to claim 2, wherein said movable member is a support shaft which is slidably supported by said slide in a tangential direction with respect to said circular arc path of said free end of said pivot arm and which holds said connector at a front end thereof, said support shaft being biased in a direction from said front end toward a rear end thereof opposite to said front end by a first spring disposed between said support shaft and said slide.

5. A device according to claim 4, wherein said support shaft has a rear end portion which terminates in said rear end, said rear end portion having a smaller diameter than the remainder of said support shaft, thereby providing a shoulder face at an end of said rear end portion opposite to said rear end, said first spring being disposed between a first spring seat which slidably fits on said rear end portion so as to be abuttable on said shoulder face and a surface of said slide, and a second spring seat which is fixed to said rear end, said first spring forcing said first spring seat against said shoulder face, said support shaft being biased in a direction from said rear end toward said front end by a second spring disposed between said front end of said support shaft and said slide, a biasing force of said second spring being smaller than that of said first spring, whereby said first spring seat is held seated on said shoulder face and said surface of said slide.

6. A device for pivoting a pivotable member about a first axis between its closed and open positions, comprising:
    a pivot arm pivotally supported about a second axis which is parallel to and adjacent to said first axis;
    an arm actuator for pivoting said pivot arm;
    a first mechanism attached to a free end of said pivot arm and supporting at least one member which is movable in a direction normal to a circular arc path taken by said free end of said pivot arm;
    connecting means attached to said movable member for removably connecting said pivot arm to said pivotable member; and
    positioning means for positioning said movable member at a predetermined position in said normal direction upon connection of said pivot arm to said pivotable member, said positioning means permitting said movable member to be moved in said normal direction after connection of said pivot arm to said pivotable member, said positioning means comprising a pair of air cylinders which are spaced apart from each other in said normal direction such that said movable member is disposed between said pair of air cylinders, said pair of air cylinders having a pair of piston rods which are movable toward each other to their respective advanced positions, and away from each other to their respective retracted positions, said piston rods substantially blocking movement of said movable member in said normal direction when said piston rods are located at their advanced positions, and said piston rods permitting movement of said movable member in said normal direction when said piston rods are located at their retracted positions.

7. A device for pivoting a pivotable member about a first axis between its closed and open positions, comprising:
a pivot arm pivotally supported about a second axis which is parallel and adjacent to said first axis;
an arm actuator for pivoting said pivot arm;
a first mechanism attached to a free end of said pivot arm and supporting at least one member which is movable in a direction normal to a circular arc path taken by said free end of said pivot arm;
connecting means attached to said movable member for removably connecting said pivot arm to said pivotable member;
positioning means for positioning said movable member at a predetermined position in said normal direction upon connection of said pivot arm to said pivotable member, said positioning means permitting said movable member to be moved in said normal direction after connection of said pivot arm to said pivotable member;
a second mechanism for supporting said movable member so as to permit said movable member to be moved in a tangential direction with respect to said circular arc path of said free end of said pivot arm;
biasing means for biasing said movable member in said tangential direction toward said free end of said pivot arm and away from said pivotable member; and
positioning stopper means for providing abutting contact with said pivotable member to position said pivotable member at said open position against a biasing action of said biasing means.

8. A device according to claim 7, wherein said second mechanism comprises:
at least one hollow member supported by said pivot arm so as to extend in said tangential direction; and
a slide pin slidably fitted in said at least one hollow member and having a front end which projects out of a corresponding end of said hollow member, said first mechanism being attached to said front end of said slide pin.

9. A device according to claim 8, wherein said slide pin has a rear end opposite to said front end, and said biasing means comprises a compression coil spring which bears at opposite ends thereof on said hollow member and said rear end of said slide pin.

10. A device according to claim 7, further comprising:
a movable base which is movably supported by said free end of said pivot arm in said tangential direction and which supports said first and second mechanisms; and
a base actuator which is provided between said free end of said pivot arm and said movable base to move said movable base toward and away from said free end of said pivot arm in said tangential direction,
said positioning stopper means comprising at least one stopper fixed to said free end of said pivot arm, said pivotable member abutting on said stopper when said movable base is moved by said base actuator toward said free end of said pivot arm.

11. A device according to claim 10, wherein said pivot arm has a bushing attached to said free end thereof so as to extend in said tangential direction, and said second mechanism comprises:
a hollow member slidably fitted in said bushing and fixed at one end thereof to said movable base, said hollow member cooperating with said bushing to guide said movable base in said tangential direction; and
a slide pin slidably fitted in said hollow member and having a front end which projects out of a corresponding end of said hollow member, said first mechanism being attached to said front end of said slide pin.

12. A device according to claim 7, wherein said positioning stopper means comprises at least one stationary member which maintains its position irrespective of pivotal movements of said pivot arm.

13. A device according to claim 1, wherein said connecting means comprises at least one vacuum cup which is connected to said pivotable member with sucking pressure acting on a surface of said pivotable member.

14. A device according to claim 13, wherein said at least one vacuum cup is attached to one end of a support shaft which functions as said movable member, said support shaft being movable in said tangential direction within a predetermined range and being biased by a spring in a direction from the other end thereof toward said one end thereof.

* * * * *